United States Patent [19]

Storch

[11] Patent Number: 5,064,213
[45] Date of Patent: Nov. 12, 1991

[54] SELF-STABILIZING TRAINING WHEELS FOR A BICYCLE

[76] Inventor: Paul Storch, 4 Parkwood Dr., Great Neck, N.Y. 11023

[21] Appl. No.: 556,301

[22] Filed: Jul. 23, 1990

[51] Int. Cl.⁵ .............................................. B62H 1/12
[52] U.S. Cl. ..................................... 280/301; 280/293
[58] Field of Search ......................... 280/293, 301, 298

[56] References Cited

U.S. PATENT DOCUMENTS

| | | | |
|---|---|---|---|
| 2,439,755 | 4/1948 | Schwinn | 280/293 |
| 2,450,979 | 10/1948 | Moller | 280/293 |
| 2,793,877 | 5/1957 | Meier | 280/293 |
| 3,642,305 | 2/1972 | Pawsat | 280/293 |
| 4,012,054 | 3/1977 | Moore | 280/293 X |
| 4,595,213 | 6/1986 | Tsuchie | 280/293 |
| 4,810,000 | 3/1989 | Saunders | 280/293 |

FOREIGN PATENT DOCUMENTS 541145 10/1941 United Kingdom ................ 280/293

*Primary Examiner*—Kenneth R. Rice
*Assistant Examiner*—Kevin Hurley
*Attorney, Agent, or Firm*—Brooks Haidt Haffner & Delahunty

[57] ABSTRACT

A stabilizing device for a bicycle includes two hinged portions on each side of the rear wheel axles, one hinged portion being attached to the bicycle frame, and the other hinged portion supporting a training wheel. Compression spring acts between each pair of associated hinged portions to increase the restoring forces on the bicycle when it tilts to one side on a turn, while the spring on the other side maintains the training wheel in contact with the ground.

9 Claims, 2 Drawing Sheets

SELF-STABILIZING TRAINING WHEELS FOR A BICYCLE

BACKGROUND OF THE INVENTION

1. Field of the Invention

This invention generally relates to bicycles, and more particularly to a self-stabilizing device including training wheels for stabilizing the bicycle when tilting while making turns.

2. Description of the Prior Art

Conventional training wheel assemblies typically consist of rigid brackets which are mounted onto the rear axle of a bicycle. One such construction is shown in U.S. Pat. No. 4,615,535. However, such brackets have very little give since they are normally formed of thick steel bars. During a sharp turn, when the bicycle tilts significantly into the turn, the bicycle weight is transferred from the main rear wheel to the training wheel on the side on which the bicycle tilts. Where the bicycle tilts excessively, and the center of gravity extends beyond the respective training wheel, restoring the balance against the centrifugal force becomes very difficult if not impossible, this resulting in an increased risk of falling.

A number of attempts have been made to provide a more flexible training wheel arrangement which can accommodate changes in the tilting positions of the bicycle. Most of these proposed training wheel constructions have generally been cumbersome, complex and expensive to manufacture. Typical of such constructions are the devices disclosed in U.S. Pat. Nos. 720,860; 1,077,210; 1,576,133; and 1,601,392. The aforementioned patents typically involve numerous combinations of articulated arms, springs and other components.

In U.S. Pat. No. 590,568, a self-balancing bicycle attachment is disclosed which includes a bifurcated arm in which there is formed a pocket or recess for receiving a spring which cooperates with a screw mounted on a lug formed on a supporting arm sharing a common pivot with the bifurcated arm. The training wheel is mounted on the bifurcated arm. The spring permits the bicycle to be yieldingly supported when in motion to conform to various inclinations of the surface over which the bicycle moves. However, the bifurcated arm and the supporting arm are also connected by means of a tension spring which prevents the bifurcated arm from swinging excessively downward as the bicycle is raised on one side. With excessive tilting, therefore, the training wheel is forced upwardly and raised above the ground. A similar problem is exhibited in U.S. Pat. No. 2,450,979 for an attachment to bicycles which is intended to afford lateral stability. However, the fixed or rigid bracket attached on each side of the bicycle includes an upwardly open vertical slot which receives a spindle on which the training wheel is mounted. While the tilting of the bicycle in one direction allows a spindle on that side to move upwardly within the open slot, the corresponding motion prevents the spindle on the other side moving below the bottom of the open slot. This causes the spindle and the training wheel mounted on it to be raised. For sharper turns involving any degree of tilt, the training wheel is raised above the ground. A further construction which shares this similar problem is disclosed in U.S. Pat. No. 4,595,213 for an auxillary wheel arrangement for use on bicycles. Here, the arms on which the training wheel are mounted are confined within U-shaped guide frames which prevent the arms from being lowered beyond a predetermined point. Again, therefore, with excessive tilt, the wheel on the side opposite to the tilting direction is raised above the ground.

In U.S. Pat. No. 4,810,000, a compensating training wheel assembly for a bicycle is disclosed which includes generally rigid brackets attached on each side of the rear wheel of the bicycle. A link member is attached to the lower end of each bracket on which the training wheels are mounted. The link members are controlled by a system of cables connected to clamps mounted via tubular portions forming the front fork of the bicycle. Such arrangement pivots the auxillary wheels between the raised and lowered conditions in response to a steering turn of the front wheel. However, this construction is somewhat complicated and cumbersome to install. Additionally, since the positions of the training wheels are only a function of the position of the steering wheel, and do not in any way depend on the tilt or orientation of the bicycle itself, the swerving of the handle bars by an inexperienced bicycle rider could destabilize the bicycle instead of promoting stability.

SUMMARY OF THE INVENTION

Accordingly, it is an object of the present invention to provide a stabilizing device for bicycles which does not have the disadvantages inherent in prior art constructions.

It is another object of the present invention to provide a stabilizing device for a bicycle which is simple in construction and economical to manufacture.

It is still another object of the present invention to provide a stabilizing device of the type aforementioned which is simple and convenient to install.

It is yet another object of the present invention to provide a stabilizing device as in the previous objects which promotes stability in all tilted positions of the bicycle by automatically maintaining contact of both trainer wheels with the ground irrespective of the tilted position of the bicycle.

In order to achieve the above objects and others which will become apparent hereafter, a stabilizing device for a bicycle in accordance with the present invention which has a frame and a rear wheel axle comprises a pair of hinges each having a hinge pin hingedly connecting a generally upright hinge portion fixedly secured to the frame on respective opposite sides of the rear wheel axle. Each hinge also includes an outwardly extending floating hinge portion having a first end hingedly connected to an associated upright hinge portion and having a second end forming a wheel support portion. A training wheel is attached to the wheel support portion of each hinge. Biasing means is provided acting between associated hinge portions of each hinge for providing restoring forces on one side of the bicycle to which the bicycle tilts on making a turn while assuring that the training wheel on the other side of the bicycle remains in contact with the ground. In this manner, both training wheels are always maintained in contact with the ground whether in the upright condition or when tilted during a turn thereby stabilizing the bicycle and providing smoother and safer turns.

BRIEF DESCRIPTION OF THE DRAWINGS

The above and other objects of the invention and the various features and details of the construction and operation thereof are hereinafter fully set forth and described with reference to the accompanying drawings, in which.

DESCRIPTION OF THE PREFERRED EMBODIMENTS

Figure 1:
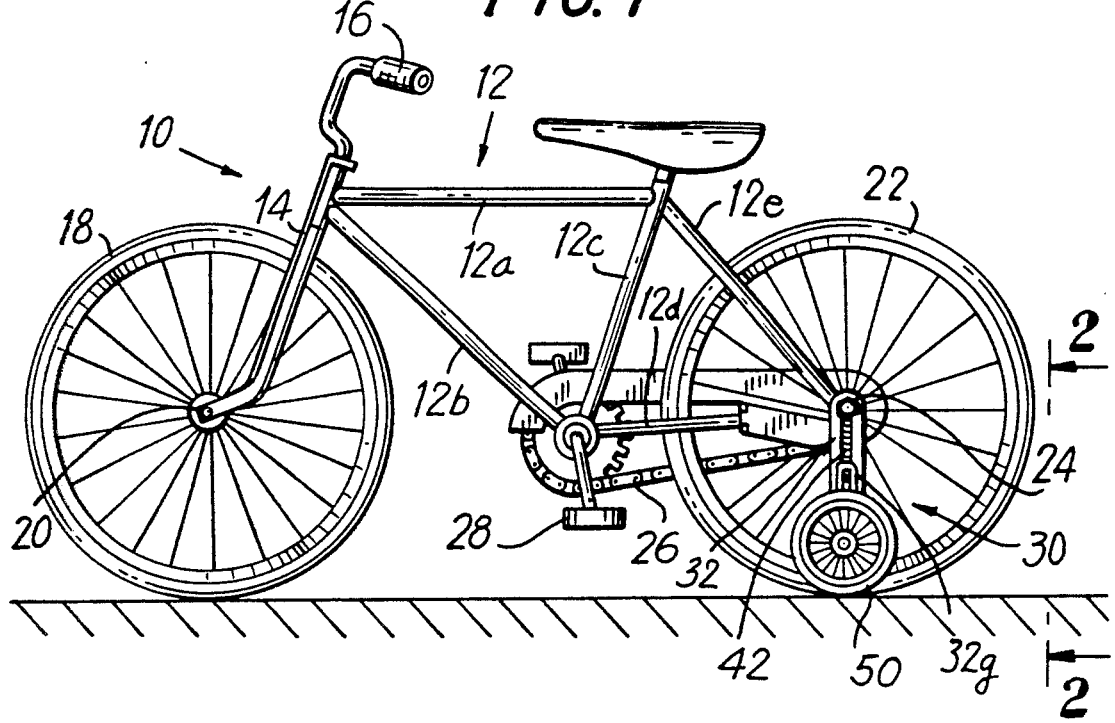
FIG. 1 is a side elevational view of a bicycle in an upright position, showing the stabilizing device in accordance with the present invention mounted thereon.

Referring now specifically to the drawings, in which identical or similar parts are designated by the same reference numerals throughout, and first referring to FIG. 1, a bicycle is generally designated by the reference numeral 10. The bicycle 10 includes a conventional frame 12 having a top frame portion 12a, a front frame portion 12b, a rear frame portion 12c, a bottom bar 12d and a rear bar 12e. The frame 12 supports a front fork 14 and a handle bar 16 for controlling the front wheel 18 mounted on a front shaft or axle 20 on the front fork 14. Similarly, the rear wheel 22 is mounted on a rear shaft or axle 24 in a conventional manner. The rear wheel 22 is rotated by means of a chain 26 which is actuated by foot pedals 28.

A stabilizing device in accordance with the present invention is generally designated by the reference numeral 30. The details of the stabilizing device 30 will be described in connection with FIGS. 2 and 3. In this connection, it is noted that the stabilizing device includes two similar assemblies which are essentially mirror images of each other and which are mounted on respective opposite sides of the rear wheel axle 24. Since the assemblies on both sides are virtually identical and operate in the same manner, the description that follows will refer to only the assembly mountable on the left side of the bicycle. However, it will be understood that the description that follows equally applies to the assembly mountable on the right side of the bicycle, and any differences in construction are obvious and would be readily evident to one skilled in the art.

The stabilizing device 30 includes a hinge generally designated by the reference numeral 32 having a hinge pin 32a hingedly connecting an upright hinge portion 32b which is intended to be fixedly secured to the frame 12 as to be described hereafter. An outwardly extending floating hinge portion 32c hares the hinge pin 32a and the hinge portions 32b and 32c can pivot in relation to each other about the hinge pin 32a with almost 360 degree freedom of movement, limited only by the other components to be described.

The upright hinge portion 32b is provided with a hole 32d at the upper end thereof for attachment to the bicycle as will be described.

The floating hinge portion 32c has an outer end remote from the connection point to the hinge pin 32a from which there depends a downwardly extending wheel support portion 32e which is provided with a vertical adjustment slot 32f. Inwardly of the wheel support portion 32e the floating hinge portion 32c is provided with a tab 32g having a hole 32h. In the embodiment being described, the tab 32g is punched from the main body surface of the floating hinge portion 32c and bent upwardly as shown, although the tab 32g can be formed in any other way, such as by welding a tab to the upper surface of the hinge portion 32c.

Provided on the upright hinge portion 32b, just below the hole 32d, there is provided a U-shaped collar generally designated by the reference numeral 34 having a base 34a and a pair of outwardly extending legs 34b and 34c which form a fork. The collar 34 may be attached to the upright hinge portion 32b in any suitable manner, such as by a weld seam 36. Of course, the legs 34b and 34c may be directly welded or otherwise rigidly joined to the upright hinge portion 32b.

A pivot pin 38 extends between the spaced legs 34b, 34c and defines an axis of rotation substantially parallel to the axis of the associated hinge. A control rod 40 is provided which is connected at the upper end 40a to an associated pivot pin 38 at a right angle as shown to thereby allow the control rod 40 to rotate about the axis of the associated pivot pin 38. The diameter of the control rod 40 and the diameter of the hole 32h in the tab 32g are dimensioned to slidably receive the other end 40b of the control rod 40.

Biasing means in the form of a compression spring 42 is provided which acts between associated hinge portions 32b, 32c of each hinge for providing restoring forces on one side of the bicycle to which the bicycle tilts on making a turn while assuring that the training wheel on the other side of the bicycle remains in contact with the ground. This is achieved by selecting compression springs which remain under compression in all positions of the bicycle during normal use including turns. The control rod 40 extends through each compression spring 42 as shown for maintaining each spring straight and prevents same from buckling.

The tab 32g serves as a stop for the compression spring 42 at lower end, while the collar 34 or a washer 43 serve as stop or abutment surfaces for the upper end of the spring.

In order to more rigidly secure the stabilizing device to the bicycle, there is advantageously provided a stabilizing bar 44 which is rigidly secured at one end to an associated upright hinge portion 32b and which extends in a direction substantially parallel to an associated hinge pin 32a. Suitable connecting means may be provided at the other or free end of the stabilizing bar for securing such free end to a portion of the bicycle frame remote from the attachment point of an associated upright hinge portion, to thereby affix the positions of the upright hinge portions 32b in relation to the frame 12. In the preferred embodiment being described, such connecting means is shown in the form of an inwardly extending locking lug portion 46 of the stabilizing arm 44, provided with an inwardly directed slot 48 dimensioned to receive the bottom bar 12d of the bicycle. Once the bottom bar 12d is inserted into the slot 48, the fixed upright hinge portion 32b is prevented from rotating about the rear shaft or axle 24.

Figure 4:
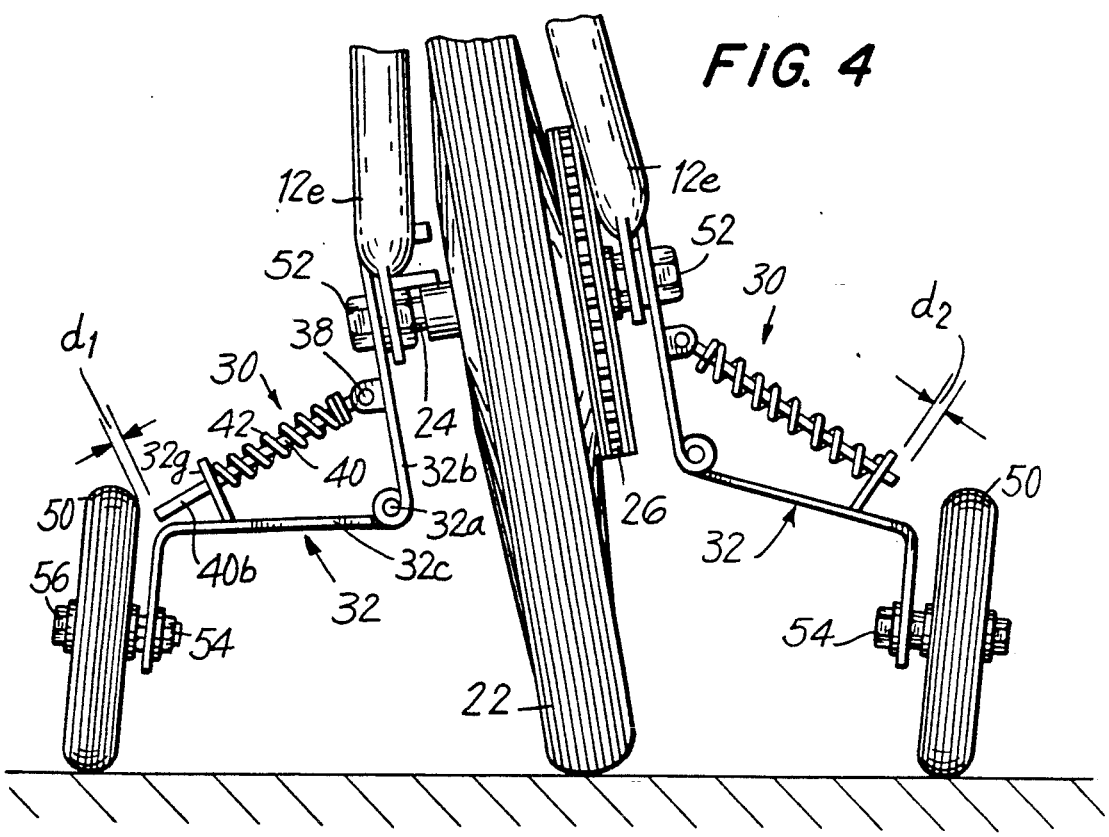
FIG. 4 is similar to FIG. 2, but showing the relative adjustments to the hinge assemblies on both sides of the bicycle during a turn when the bicycle tilts in the direction of the turn.

Training wheels 50 are mounted on the wheel support portion 32e in any conventional manner, by the use of a wheel axle or shaft (not shown) and nuts 54, 56. Preferably, the training wheels are formed of a soft rubber or are formed of inflatable tubes which help to cushion the ride and better absorb obstacles along the way. Referring to FIG. 4, the positions of the collars 34, the tabs 32g and the lengths of the control rods 40 are so selected so that for maximum anticipated tilts of the bicycle, there always remains a clearance between the free end of the control rod 40 and the hinge portion 32c and the training wheel 50 so that the distance $d_1$ is never reduced to zero during normal use. Similarly, during such conditions of maximum tilt, the distance $d_2$ which represents the projection of the rod beyond the tab 32g should not be reduced to zero in order to avoid having the control rod separate from the tab 32g. In this way, the control rods are always retained and continue to be guided by the tabs 32g. Since such tabs also serve as stops for the lower ends of the compression springs, such arrangements also prevents the compression spring from moving off of the control rod and being lost.

Figure 2:
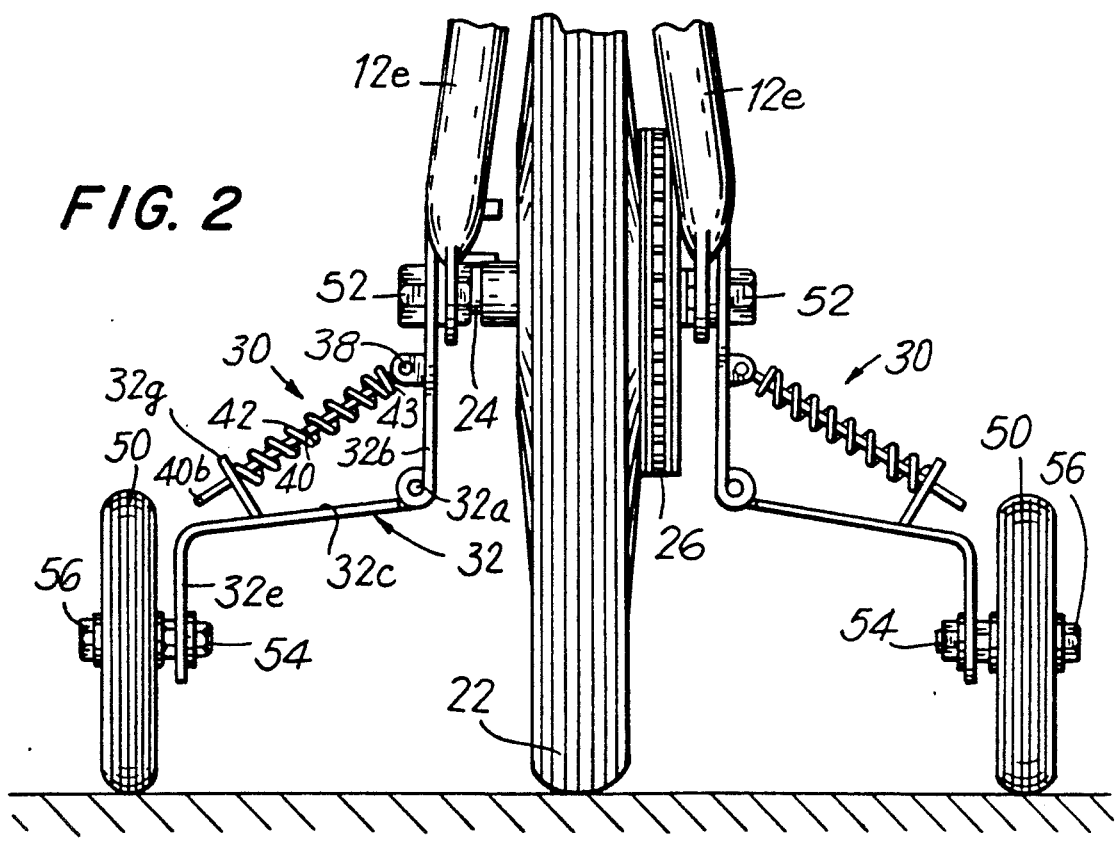
FIG. 2 is an enlarged and fragmented rear elevational view of the bicycle shown in FIG. 1, showing the stabilizing device of the present invention as provided on both sides of the bicycle.
Figure 3:
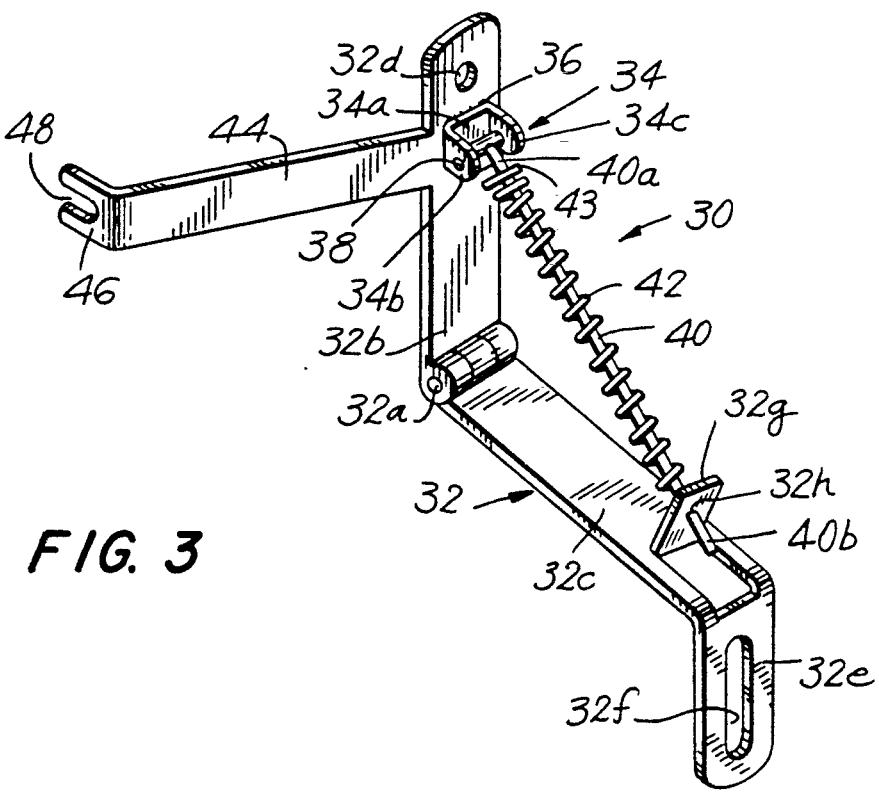
FIG. 3 is a perspective view of one hinge assembly mountable on the left side of the bicycle which forms a part of the stabilizing device, shown without the training wheel.

It will be appreciated from the above discussion that the compression springs 42 are so selected that they are always under compression, being intermediately compressed in the normal upright condition of the bicycle as shown in FIG. 2.

With the instant stabilizing device, both training wheels are always maintained in contact with the ground whether in the upright condition or when tilted during a turn. The dimensions of the hinges and the diameters of the training wheels are advantageously selected to arrange the floating hinge portions 32c in substantially horizontal orientations.

It will be evident that the compression springs 42 are forced to occupy varying distances between associated collars 34 and tabs 32g thereby imparting varying restoring forces to the bicycle as a function of the angle of tilt. In FIG. 2, when the bicycle is upright, both springs 42 on both sides of the bicycle are equally compressed and exhibit the same restoring forces thereby canceling each other out. Referring to FIG. 4, the bicycle is shown tilted towards the left, as when making a left turn. The tilting of the upright hinge portion 32b on the left side moves in the direction of its associated floating hinge portion 32c, causing the associated control rod to slide further through its tab 32g in the direction of its associated training wheel. The spring on the left hand side, therefore, is further compressed thereby creating greater restoring forces tending to upright the bicycle. The upright hinge portion on the right hand side simultaneously moves away from its associated floating hinge portion 32c, increasing the distance between the associated collar 34 and tab 32g allowing the compression spring to expand. The restoring forces imparted by such compression spring are, therefore, reduced. However, the compression spring nevertheless remains under compression insuring that the floating hinge portion 32c is urged downwardly to insure that the training wheel on the right hand side maintains contact with the ground.

The stabilizing device of the present invention provides for smoother and safer turns, allows the natural tendency to lean into a turn, and, clearly, is extremely simple and inexpensive to manufacture as well as very easy and convenient to install.

While a particular embodiment of the present invention has been illustrated and described herein, it is not intended to limit the invention to such disclosure, and changes and modifications may be made therein and thereto within the scope of the appended claims.

I claim:

1. A stabilizing device for a bicycle having a frame and a rear wheel axle comprising a pair of hinges each having a hinge pin hingedly connecting a generally upright hinge portion fixedly secured to the frame on respective opposite sides of the rear wheel axle, and an outwardly extending floating hinge portion having a first end hingedly connected to an associated upright hinge portion and having a second end forming a wheel support portion; a training wheel attached to the wheel support portion of each hinge; and biasing means acting between associated hinge portions of each hinge for providing restoring forces on one side of the bicycle to which the bicycle tilts on making a turn while assuring that the training wheel on the other side of the bicycle remains in contact with the ground, said biasing means comprising a compression spring which remains under compression in all positions of the bicycle during normal use including turns, whereby both training wheels are always maintained in contact with the ground whether in the upright condition or when tilted during a turn thereby stabilizing the bicycle and providing smoother and safer turns.

2. A stabilizing device as defined in claim 1, further comprising a control rod extending through each compression spring for maintaining each spring straight and preventing same from buckling.

3. A stabilizing device as defined in claim 2, wherein each control rod is pivotally connected to an associated upright hinge portion and slidably connected to an associated floating hinge portion.

4. A stabilizing device as defined in claim 3, further comprising a pair of spaced legs extending outwardly from each upright hinge portion to form a fork, a pivot pin extending between said spaced legs of each fork and defining an axis of rotating substantially parallel to the axis of the associated hinge, each control rod being connected at one end to an associated pivot pin at a right angle thereto to thereby allow the control rod to rotate about an axis of the associated pivot pin.

5. A stabilizing device as defined in claim 4, wherein said floating hinge portion is provided with an upwardly extending tab proximate to said wheel support portion, said tab having a hole dimensioned to slidably receive the other end of an associated control rod, and serving as a stop for said compression spring while allowing said control rods to slide therethrough, whereby said compression springs are forced to occupy varying distances between associated fork pivot pins and tabs thereby imparting varying restoring forces to the bicycle.

6. A stabilizing device as defined in claim 1, further comprising a stabilizing bar rigidly secured at one end to an associated upright hinge portion and extending in a direction substantially parallel to an associated hinge pin, and connecting means for rigidly securing another end of said stabilizing bar to a portion of the bicycle frame remote from the attachment point of an associated upright hinge portion to thereby fix the positions of said upright hinge portions in relation to the frame.

7. A stabilizing device as defined in claim 1, wherein said training wheels are formed of soft rubber.

8. A stabilizing device as defined in claim 1, wherein said training wheels are formed of inflatable tubes.

9. A stabilizing device as defined in claim 1, wherein the dimensions of said hinges and training wheels are selected to arrange said floating hinge portions in substantially horizontal orientations.

* * * * *